No. 739,784. PATENTED SEPT. 22, 1903.
W. J. HARRIS & H. CASE.
REEL FOR FISHING RODS.
APPLICATION FILED JUNE 4, 1902.
NO MODEL. 2 SHEETS—SHEET 1.
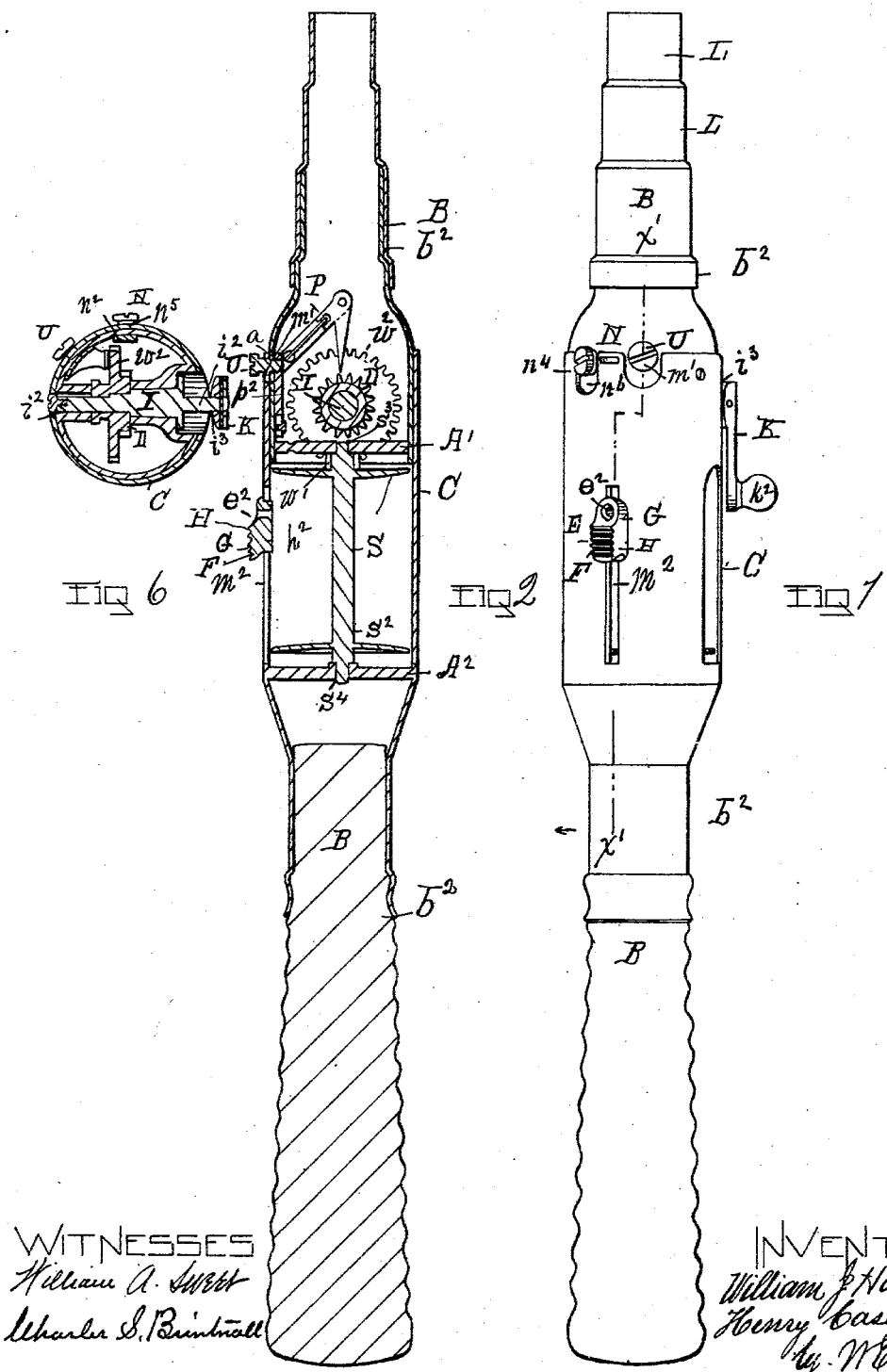

No. 739,784. PATENTED SEPT. 22, 1903.
W. J. HARRIS & H. CASE.
REEL FOR FISHING RODS.
APPLICATION FILED JUNE 4, 1902.
NO MODEL. 2 SHEETS—SHEET 2.
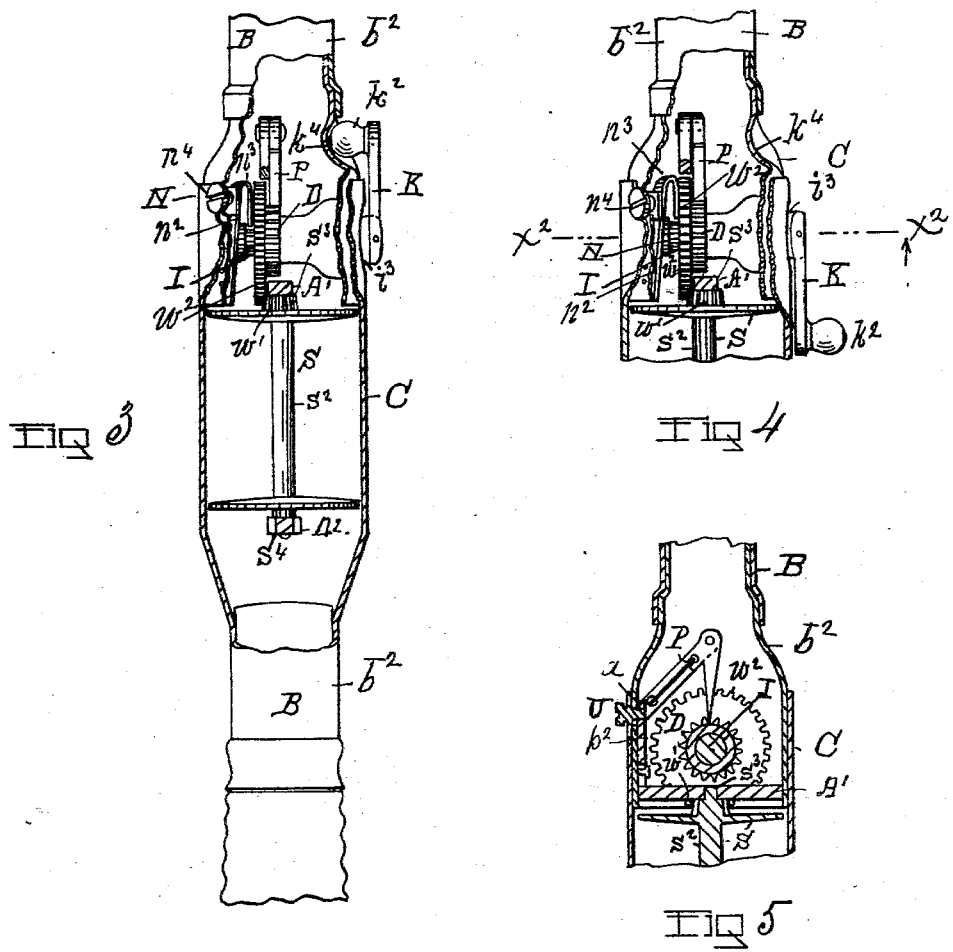

No. 739,784. Patented September 22, 1903.

UNITED STATES PATENT OFFICE.

WILLIAM J. HARRIS AND HENRY CASE, OF GLOVERSVILLE, NEW YORK; SAID CASE ASSIGNOR TO CLARK L. JORDAN, OF GLOVERSVILLE, NEW YORK.

REEL FOR FISHING-RODS.

SPECIFICATION forming part of Letters Patent No. 739,784, dated September 22, 1903.

Application filed June 4, 1902. Serial No. 110,184. (No model.)

*To all whom it may concern:*

Be it known that we, WILLIAM J. HARRIS and HENRY CASE, citizens of the United States, residing at the city of Gloversville, Fulton county, and State of New York, have jointly invented new and useful Improvements in Reels for Fishing-Rods, of which the following is a specification.

Our invention relates to improvements upon reels for fishing-rods, and more particularly to the production of a reel and its arrangement within and upon the butt of the rod, with the reel-axle parallel to the axis of the butt, so that the reel is not offset from the latter for attachment and detachment.

Our invention also relates to a means whereby the line when being wound upon the reel-spool is equally distributed throughout the length of the latter and also to a means whereby the tension of the line being drawn from off the reel may be regulated and also to the construction and arrangement of a click and click-wheel, all of which will be more fully set forth hereinafter and specified in the claims.

The object and purpose of our invention is to avoid the location of the reel upon one side of the rod, and thus prevent the unevenly-balanced tendency it has when so located and the butt of the rod is grasped for fly-casting. Our improvement has the further advantage of having no offset reel part to catch in twigs and branches when being carried through the woods or along the brush-grown banks of brooks and streams.

Accompanying this specification to form a part of it there are three plates of drawings containing six figures illustrating the application of our invention with the same designation of parts by letter reference used in all of them.

Of the illustrations, Figure 1 is a side elevation of a fishing-rod butt with our invention applied thereto. Fig. 2 is a section taken on the line $x'\,x'$ of Fig. 1, illustrated with the click-pawl shown as moved away from its engagement with the click-wheel. Fig. 3 is a front elevation of the apparatus with that part of the exterior cylinder inclosing the reel-spool and its operating mechanism shown as cut away and the operating-crank shown as folded inwardly. This figure also illustrates the drag as in a position to engage with the main-wheel shaft. Fig. 4 is a side elevation in part of the same mechanism which is shown at Fig. 3, with the operating-crank illustrated as turned down on its hinged connection and in a position for operating the reel, the drag being shown in this figure as moved away from contact with the driving-shaft. Fig. 5 is a section taken on the line $x'\,x'$ of Fig. 1, with the click-pawl shown to be in engagement with the click-wheel. Fig. 6 is a section taken transversely on the line $x^2\,x^2$ of Fig. 4.

The several parts of the apparatus thus illustrated are designated by letter reference, and the function of the parts is described as follows:

The letter B designates the butt of a fishing-rod, which is preferably formed in two parts $b^2\,b^2$, that are connected by means of a cylinder C, each of the ends of which are passed on over and secured to one end of the butt parts $b^2$, with the cylinder preferably expanded between where its ends each connect to one of the butt parts.

The letters A' A² designate two cross-bars arranged within the cylinder C, and the letter S designates the reel-spool, which is also arranged within the cylinder C, having its shaft S² provided with a bearing in which to journal at S³ in the bar A' and at S⁴ in the bar A². On this connection the spool S is free to turn within the cylinder C. The outer end of this spool-shaft in advance of where entering its bearing in the bar A' has mounted thereupon the spur-wheel $w'$.

The letter I designates the main driving-shaft, which is arranged transversely within the cylinder C, and it is provided with bearings $i^2\,i^2$ in the opposite sides of the cylinder wherein to journal. This shaft I has mounted upon it to turn with it the gear-wheel $w^2$, with the teeth of the latter arranged to mesh into the teeth of the spur-wheel $w'$, so that when the shaft I is operated to turn in its bearings the wheel $w^2$ by its engagement with the spur-wheel $w'$ will actuate the latter and the reel-spool S to turn also.

The letter K designates a crank that is mounted upon the projecting end $i^3$ of the shaft I, and this crank is hinged onto the end of the shaft I where connected thereto, so that it can be turned down and have its outer grasping end $k^2$ entered within the sink $k^4$, formed in the side of the cylinder C, when the crank is not in use.

The letter D designates a click-wheel formed integrally with the gear-wheel $w^2$ upon the inner side of the latter and with it mounted upon the driving-shaft I, and the letter P designates a click-pawl. This click-pawl at its outer arm $a$ is connected to the top of a bar $p^2$, which latter at its lower end makes a sliding connection with the interior of the cylinder C, and the letter U designates a finger-piece having its shank passing through a vertical slot $m'$, formed in the cylinder C, where this shank will connect with the bar $p^2$ at its upper end. When this finger-piece U is moved outwardly, the click-pawl is also moved outwardly away from engagement with the teeth of the click-wheel D, with the upper end of the bar $p^2$ yielding when the pawl-click is passing over the teeth of the click-wheel and the finger-piece U is moved downwardly.

The letter $m^2$ designates a slot that is formed longitudinally in the cylinder C, and the letter G designates a line-guide arranged to be moved back and forth in said slot. This line-guide consists of an outer plate E, having a line-passage $e^2$ formed therein directly over the slot $m^2$, through which the line to be wound and unwound from off the reel-spool passes. This plate E connects with a plate part H, having a finger-piece F projected outwardly therefrom, with this finger-piece arranged to pass through the slot $m^2$ to connect at $h^2$ with a plate straddling the slot on the inside of the cylinder C to thus retain the line-guide within the slot. The plate straddling the slot is not shown. When the reel is being operated to wind up the line, this line-guide, as moved back and forth by the holder of the butt, will distribute the line equally throughout the length of the reel.

The letter N designates a drag or brake arranged to bear upon the driving-shaft I to increase the tension upon the line being unwound from off the reel. This drag or brake consists of a bar $n^2$, arranged longitudinally within the cylinder C at one side thereof, with the hook-form end $n^3$ arranged to bear on the upper side of the driving-shaft I, with this bar operated to rise and fall by means of a finger-piece $n^4$, having a shank arranged to pass through a slot $n^6$, formed in the cylinder C and thereat connected with the drag-bar $n^2$.

The letters L designate ferrules whereby the butt may be adapted to connect with the jointed parts of differing sizes of rods.

We do not limit our invention herein to any scale or proportion in its application nor to the exact details of construction which we have shown and described, which may be varied so long as the parts perform the same function in substantially the same manner.

Having thus described our invention, what we claim, and desire to secure by Letters Patent, is—

1. The combination with the butt of a fishing-rod, of a reel mounted therein with its axis parallel to that of the rod-butt; a cylinder inclosing said reel, and provided with a drag-slot at its outer end; a driving-shaft provided with bearings in which to journal in the opposite sides of the cylinder; a gear-wheel mounted upon said driving-shaft; a pinion upon the adjacent end of the reel-shaft arranged to mesh into the gear-wheel on the driving-shaft; a drag-bar having a downturned upper end arranged within said cylinder; a finger-piece placed exteriorly upon the latter, and arranged to slide in said drag-slot, and operate the downturned end of the drag-bar to bear upon the driving-shaft, and thus increase the tension upon the line being drawn from off the reel substantially as shown and described.

2. The combination with the butt of a fishing-rod, of a reel mounted therein with its axis parallel to that of the rod-butt; a cylinder arranged to inclose said reel and having a click-slot in its upper end; a driving-shaft made to journal in the opposite sides of the cylinder; a gear-wheel mounted upon said driving-shaft arranged to mesh into a pinion upon the adjacent end of the reel-shaft; a click-wheel mounted upon said driving-shaft to turn with it; a pawl connecting with a vertically-arranged slide-bar on the inner face of the cylinder; and a finger-piece arranged in said click-slot to connect with said slide-bar, whereby said pawl may be operated to engage with the teeth of said click-wheel substantially as, and for the purposes set forth.

Signed at the city of Gloversville, New York, in the presence of the two witnesses whose names are hereto written, this 27th day of May, 1902.

WILLIAM J. HARRIS.
    HENRY CASE.

Witnesses:
    EDWARD L. POTTER, Jr.,
    JOHN L. HINDES.